(12) United States Patent
Moghaddamnia et al.

(10) Patent No.: US 8,942,330 B2
(45) Date of Patent: Jan. 27, 2015

(54) INTERFERENCE REDUCTION METHOD FOR DOWNHOLE TELEMETRY SYSTEMS

(75) Inventors: Sanam Moghaddamnia, Hannover (DE); Feng Zheng, Duisburg (DE); Imed Ben Brahim, Hannover (DE); Wojciech Emmerich, Celle (DE); Christian Hansen, Sehnde (DE); Jens-Uwe Bruns, Burgdorf (DE)

(73) Assignee: Baker Hughes Incorporated, Houston, TX (US)

( * ) Notice: Subject to any disclaimer, the term of this patent is extended or adjusted under 35 U.S.C. 154(b) by 468 days.

(21) Appl. No.: 13/352,714

(22) Filed: Jan. 18, 2012

(65) Prior Publication Data

US 2013/0181843 A1 Jul. 18, 2013

(51) Int. Cl.
H03D 1/04 (2006.01)
H04B 1/10 (2006.01)
(52) U.S. Cl.
CPC .................................... H04B 1/10 (2013.01)
USPC ........... 375/346; 375/316; 375/350; 375/259; 375/285; 367/81; 370/286; 340/853.2; 455/63.1
(58) Field of Classification Search
USPC ............ 375/346, 316, 350, 259, 285; 367/81; 370/286; 340/853.2; 455/63.1
See application file for complete search history.

(56) References Cited

U.S. PATENT DOCUMENTS

| 4,642,800 | A | 2/1987 | Umeda |
| 5,479,440 | A | 12/1995 | Esfahani |
| 5,612,978 | A * | 3/1997 | Blanchard et al. ............ 375/350 |
| 5,742,591 | A | 4/1998 | Himayat et al. |
| 6,023,658 | A | 2/2000 | Jeffryes |
| 6,741,185 | B2 | 5/2004 | Shi et al. |
| 6,847,689 | B1 | 1/2005 | Vuorinen et al. |
| 2002/0198706 | A1 | 12/2002 | Kao et al. |
| 2005/0075870 | A1* | 4/2005 | Chamberlain ................ 704/226 |
| 2010/0232616 | A1* | 9/2010 | Chamberlain et al. ....... 381/71.1 |
| 2010/0305864 | A1 | 12/2010 | Gies |
| 2010/0314169 | A1 | 12/2010 | Jarrot et al. |

OTHER PUBLICATIONS

Klotz, A New Mud Pulse Telemetry System for Enhanced MWD/LWD Applications, Conference Paper, Mar. 2008, 5 pages, This paper was prepared for presentation at the 2008 IADC/SPE Drilling Conference held in Orlando, Florida, U.S.A., Mar. 4-6, 2008. IADC/SPE112683.
Notification of Transmittal of the International Search Report and the Written Opinion of the International Searching Authority, or the Declaration; PCT/US2013/022089; May 3, 2013.

* cited by examiner

*Primary Examiner* — Siu Lee
(74) *Attorney, Agent, or Firm* — Cantor Colburn LLP

(57) ABSTRACT

A method for reducing interference in a received downhole telemetry signal includes: segmenting a received signal; windowing each signal segment; transforming each windowed signal segment into a complex variable domain to generate a plurality of complex variable domain segments with an in-phase component vector I and a quadrature component vector Q; calculating a real amplitude vector A from the I and the Q vectors; filtering interferers in the amplitude vector A for each complex variable domain segment to generate a filtered amplitude vector Ã; recalculating an amplitude of the amplitude vector A using the filtered amplitude vector Ã to generate an output amplitude vector Â; scaling the I and the Q vectors by a factor Â/A to generate an output in-phase component vector I' and an output quadrature component vector Q'; and transforming I' and Q' into the time domain to provide an interference-reduced output signal in the time domain.

20 Claims, 3 Drawing Sheets

INTERFERENCE REDUCTION METHOD FOR DOWNHOLE TELEMETRY SYSTEMS

BACKGROUND

Boreholes are drilled deep into the earth for many applications such as carbon dioxide sequestration, geothermal production, and hydrocarbon exploration and production. The boreholes are drilled using a drill tubular having a drill bit disposed at the distal end. A pump at the surface of the earth pumps drilling fluid sometimes referred to as drilling mud internally in the drill tubular to the drill bit to flush cuttings and lubricate the drill bit.

It is known in the drilling industry that a downhole tool may be used to characterize earth formations while a borehole is being drilled or during a temporary halt in drilling in operations referred to as logging-while-drilling (LWD) or measurement-while-drilling (MWD). Data obtained from the tool in one or more applications is transmitted uphole to the surface of the earth using mud-pulse telemetry. The data is then used for formation analysis or to monitor the drilling operation.

In mud-pulse telemetry, the data obtained from the tool is encoded and modulated into as an acoustic signal. The acoustic signal is transmitted using the drilling fluid as a transmission medium. Unfortunately, the drilling operation and especially the mud pump can cause interference with the mud-pulse data signals, which can lead to a loss of information or a signal delay. Hence, it would be well received in the drilling industry if the transmission of mud-pulse telemetry signals could be improved.

BRIEF SUMMARY

Disclosed is a method for reducing interference in a received downhole telemetry signal. The method includes: receiving a downhole telemetry signal in a time domain with a receiver; segmenting the received signal into a plurality of signal segments; windowing each signal segment in the plurality of signal segments to generate a plurality of windowed signal segments; transforming each windowed signal segment in the plurality of windowed signal segments into a complex variable domain to generate a plurality of complex variable domain segments, each complex variable domain segment having an in-phase component vector I and a quadrature component vector Q; calculating a real amplitude vector A from the in-phase component vector I and the quadrature component vector Q for each complex variable domain segment; filtering interferers in the amplitude vector A for each complex variable domain segment to generate a filtered amplitude vector $\tilde{A}$ for each complex variable domain segment; recalculating an amplitude of the amplitude vector A using the filtered amplitude vector $\tilde{A}$ for each complex variable domain segment to generate an output amplitude vector $\hat{A}$ for each complex variable domain segment; scaling the in-phase component vector I and the quadrature component vector Q by a factor $\hat{A}/A$ for each complex variable domain segment to generate an output in-phase component vector I' and an output quadrature component vector Q' for each complex variable domain segment; and transforming I' and Q' for each complex variable domain segment into the time domain to provide an interference-reduced output signal in the time domain; wherein the segmenting, windowing, transforming each windowed signal segment, calculating a real amplitude vector A, filtering, recalculating, scaling I and Q, and transforming I' and Q' are performed using a processor.

Also disclosed is an apparatus for reducing interference in a received mud-pulse telemetry signal. The apparatus includes: a receiver configured to receive a downhole telemetry signal in a time domain; and a processor coupled to the receiver and configured to implement a method that includes: segmenting the received signal into a plurality of signal segments; windowing each signal segment in the plurality of signal segments to generate a plurality of windowed signal segments; transforming each windowed signal segment in the plurality of windowed signal segments into a complex variable domain to generate a plurality of complex variable domain segments, each complex variable domain segment having an in-phase component vector I and a quadrature component vector Q; calculating a real amplitude vector A from the in-phase component vector I and the quadrature component vector Q for each complex variable domain segment; filtering interferers in the amplitude vector A for each complex variable domain segment to generate a filtered amplitude vector $\tilde{A}$ for each complex variable domain segment; recalculating an amplitude of the amplitude vector A using the filtered amplitude vector $\tilde{A}$ for each complex variable domain segment to generate an output amplitude vector $\hat{A}$ for each complex variable domain segment; scaling the in-phase component vector I and the quadrature component vector Q by a factor $\hat{A}/A$ for each complex variable domain segment to generate an output in-phase component vector I' and an output quadrature component vector Q' for each complex variable domain segment; and transforming I' and Q' for each complex variable domain segment into the time domain to provide an interference-reduced output signal in the time domain Further disclosed is a non-transitory computer readable medium having computer executable instructions for reducing interference in a received downhole telemetry signal by implementing a method that includes: segmenting a received downhole telemetry signal in a time domain into a plurality of signal segments; windowing each signal segment in the plurality of signal segments to generate a plurality of windowed signal segments; transforming each windowed signal segment in the plurality of windowed signal segments into a complex variable domain to generate a plurality of complex variable domain segments, each complex variable domain segment having an in-phase component vector I and a quadrature component vector Q; calculating a real amplitude vector A from the in-phase component vector I and the quadrature component vector Q for each complex variable domain segment; filtering interferers in the amplitude vector A for each complex variable domain segment to generate a filtered amplitude vector $\tilde{A}$ for each complex variable domain segment; recalculating an amplitude of the amplitude vector A using the filtered amplitude vector $\tilde{A}$ for each complex variable domain segment to generate an output amplitude vector $\hat{A}$ for each complex variable domain segment; scaling the in-phase component vector I and the quadrature component vector Q by a factor $\hat{A}/A$ for each complex variable domain segment to generate an output in-phase component vector I' and an output quadrature component vector Q' for each complex variable domain segment; and transforming I' and Q' for each complex variable domain segment into the time domain to provide an interference-reduced output signal in the time domain; wherein the segmenting, windowing, transforming each windowed signal segment, calculating a real amplitude vector A, filtering, recalculating, scaling I and Q, and transforming I' and Q' are performed using a processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
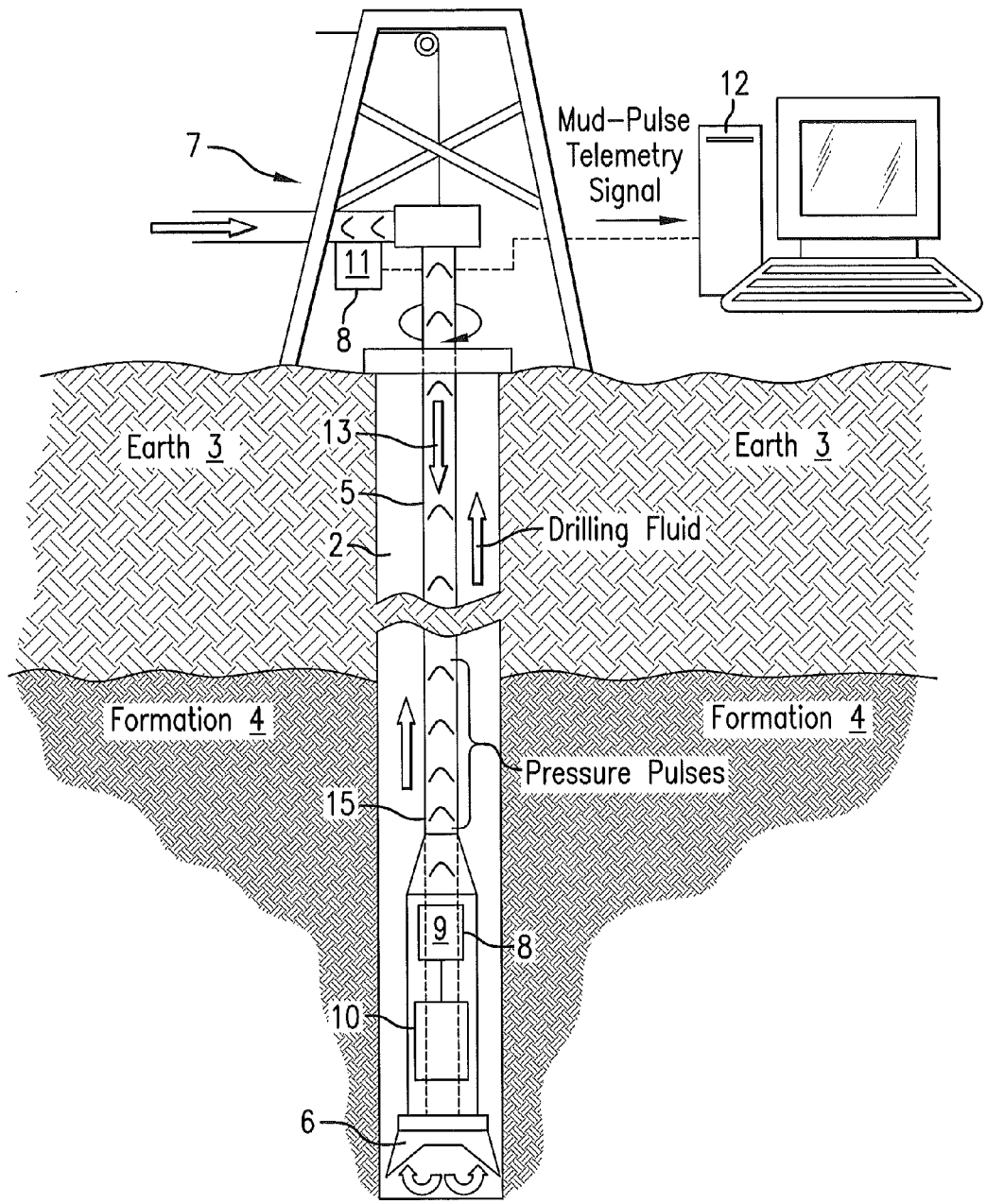
FIG. 1 illustrates an exemplary embodiment of a downhole tool disposed in a borehole penetrating the earth.

FIG. 1 illustrates an exemplary embodiment of a downhole tool 10 disposed in a borehole 2 penetrating the earth 3, which includes an earth formation 4. The formation 4 represents any subsurface material of interest. The downhole tool 10 is conveyed through the borehole 2 by a carrier 15 such as a drill tubular 5 in one embodiment. Disposed at the distal end of the drill tubular 5 is a drill bit 6. A drilling rig 7 is configured to conduct drilling operations such as rotating the drill tubular 5 and thus the drill bit 6 in order to drill the borehole 2. In addition, the drilling rig 7 is configured to pump drilling fluid 13 internally through the drill tubular 5 in order to lubricate the drill bit 6 and flush cuttings from the borehole 2.

The downhole tool 10 is configured to perform measurements while the borehole 2 is being drilled or during a temporary halt in drilling. A mud-pulse telemetry system 8 is coupled to the downhole tool 10 and configured to transmit measurement data to the surface of the earth 3. The mud-pulse telemetry system 8 includes a transmitter 9 and a receiver 11. The transmitter 9 is configured to encode the measurement data into a series of acoustic pulses that are transmitted in the drilling fluid internal to the drill tubular 5. In another embodiment, the drilling fluid in the annulus external to the drill tubular 5 can used to transmit the series of acoustic pulses. The receiver 11 disposed remote from the downhole tool 10 at or near the surface of the earth 3 is configured to receive the acoustic pulses (i.e., mud pressure pulses) and convert the acoustic pulses into an electrical (or optical) signal for processing. The electrical signal represents the acoustic pulses over a period of time in the time domain. A computer processing system 12 is coupled to the receiver 11 and configured to receive and process the electrical signal containing the measurement data. The processing includes extracting the measurement data for use by drilling operators and analysts. In order to accurately extract the measurement data, the computer processing system 12 is configured to reduce inference that is induced into the acoustic mud-pulse signals during transmission to the surface of the earth 3 or at the surface. Non-limiting examples of the interference include distortion and masking of the acoustic pulses. The interference is represented in the electrical signals received from the receiver 11. An interference reduction algorithm that implements an interference reduction method disclosed herein is executed by the computer processing system 12 to reduce the interference in order to obtain the measurement data.

The interference reduction method is particularly useful for canceling strong narrow band interferers (e.g., sine waves) from a broadband telemetry signal. The interference reduction method requires a sampled version of the mud-pulse pressure signal received by the receiver 11 at the surface.

Figure 2:
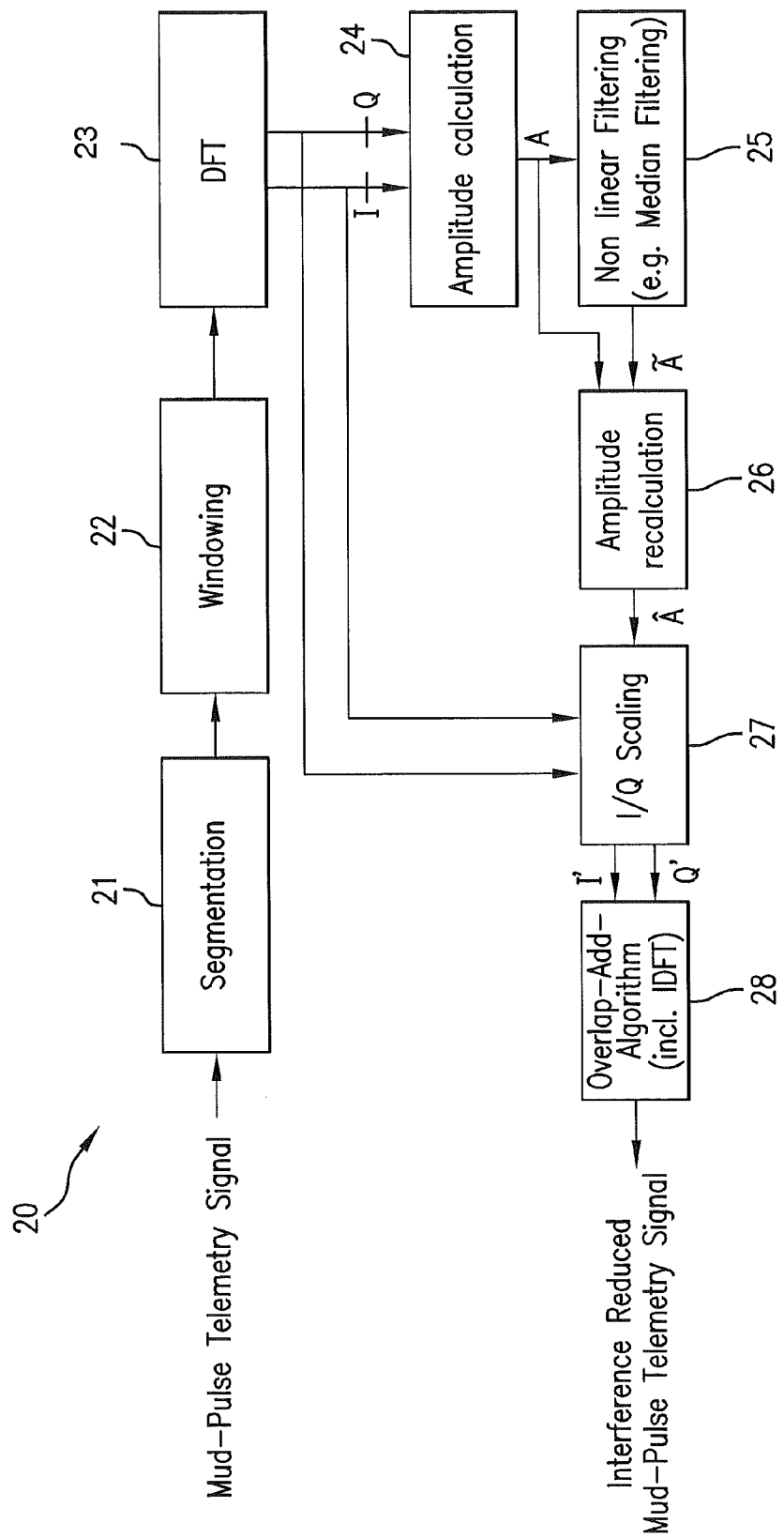
FIG. 2 illustrates a block diagram of a method to reduce interference in received mud-pulse telemetry signals.

FIG. 2 illustrates a block diagram that depicts aspects of an interference reduction method 20. In block 21, the mud-pulse telemetry signal (i.e., pressure pulses over time) is segmented into overlapping segments. The length of each segment and an amount of overlap are configurable. In one or more embodiments, the length of each segment is 25 seconds and the overlap is 60%. In the following discussion, the length of each segment is denoted by N.

In block 22, the signal in each segment is windowed and then transformed in block 23 into a complex variable domain (i.e., frequency domain). In one or more embodiments the windowing function is a Hamming window, but other windowing functions may also be used instead of the Hamming window. The main purpose of the windowing function is to reduce unavoidable spectral leakage of information from the signal caused by the transformation of the mud-pulse signal to the complex variable domain to a tolerable amount. The transformation is performed in blocks with a block length M. If M is greater than N, then zero padding may be used to fill in the difference. In one or more embodiments, windowing can include using the segmented signals as the windowed signals such that a "rectangular window" is used to segment the received telemetry signals.

After the transformation to the complex variable domain, the in-phase component vector I and the quadrature component vector Q of each segment are converted into an amplitude vector A, as shown in Block 24. The vector A contains real-valued elements. The I/Q signal is then directly fed into block 27 for I/Q scaling.

Next, in Block 25, the amplitude vector A is filtered by a non-linear filtering operation configured to cancel out (high) amplitude values caused by narrowband interferers. This operation results in filtered amplitude vector $\tilde{A}$. In one or more embodiments, the non-linear filtering operation is performed by a median filter. In one or more embodiments, the median filter is selected to have an order between 25 and 35 and is used with a DFT having a frequency resolution of 50 mHz. Alternatively, the interferer amplitudes may be detected by applying a peak detection algorithm to the amplitudes in A. In this case, the interferer amplitudes are replaced by their neighboring values in the amplitude vector A.

It can be appreciated that an advantage of Block 25 in the present method is that for the purpose of interferer cancellation no explicit knowledge of the interferer frequencies is necessary.

The next step, as depicted in Block 26, is to recalculate and update the amplitude vector A. The removal of the interferer amplitudes is performed in this block. For interferer cancellation or removal, only the input amplitude vector A and the filtered output vector $\tilde{A}$ are compared. The output amplitude vector leading out of Block 26 is denoted by $\hat{A}$.

There are many ways to remove the interferers from the amplitude vector A to form the output amplitude vector $\hat{A}$. One approach is to calculate the difference between the amplitude vectors A and $\tilde{A}$: $d1=|A-\tilde{A}|$. If one element of the difference vector d1 is greater than a predefined threshold t1, then its corresponding amplitude element of the amplitude vector $\tilde{A}$ is used for calculation of the corresponding output amplitude element of vector $\hat{A}$. Instead of calculating a difference d1, another approach is to compare A against a predefined threshold vector $c=(t2+1)\tilde{A}$. The thresholds t1 and t2 are configurable. To allow fast signal level adaption, the thresholds are updated by using the complex valued domain signal. A third approach to remove the interferers from the amplitude vector A is to copy the vector A into the vector $\hat{A}$ and then replace the K largest values in the vector $\hat{A}$ with the corresponding values in vector $\tilde{A}$. The advantage of this approach is that no comparison against a threshold is necessary.

After having calculated the new amplitude vector $\hat{A}$, the next step, as depicted in Block 27, is to scale each element of the original I/Q signal with its corresponding amplitude factor Â/A phase vector PHI and calculate the in phase component I' and the quadrature component Q'.

In the final step, as depicted in Block 28, the complex values Z=I'+jQ' are transformed back to the original domain (i.e., the time domain). In one or more embodiments, this transformation is accomplished using an inverse discrete Fourier transform (IDFT). As the original signal has been segmented in Block 21 with a selected overlap (e.g., 60%), the final output signal is calculated using the same amount of overlap. In one or more embodiments, the output signal is calculated using the efficient Overlap-Add method.

After applying the interference reduction method 20 to the sampled mud-pulse telemetry signals corresponding to the received mud pressure pulses, the output signal does not contain strong narrowband interferers (i.e., individual sine waves) and still contains the measurement data transmitted by the transmitter 9.

Figure 3:
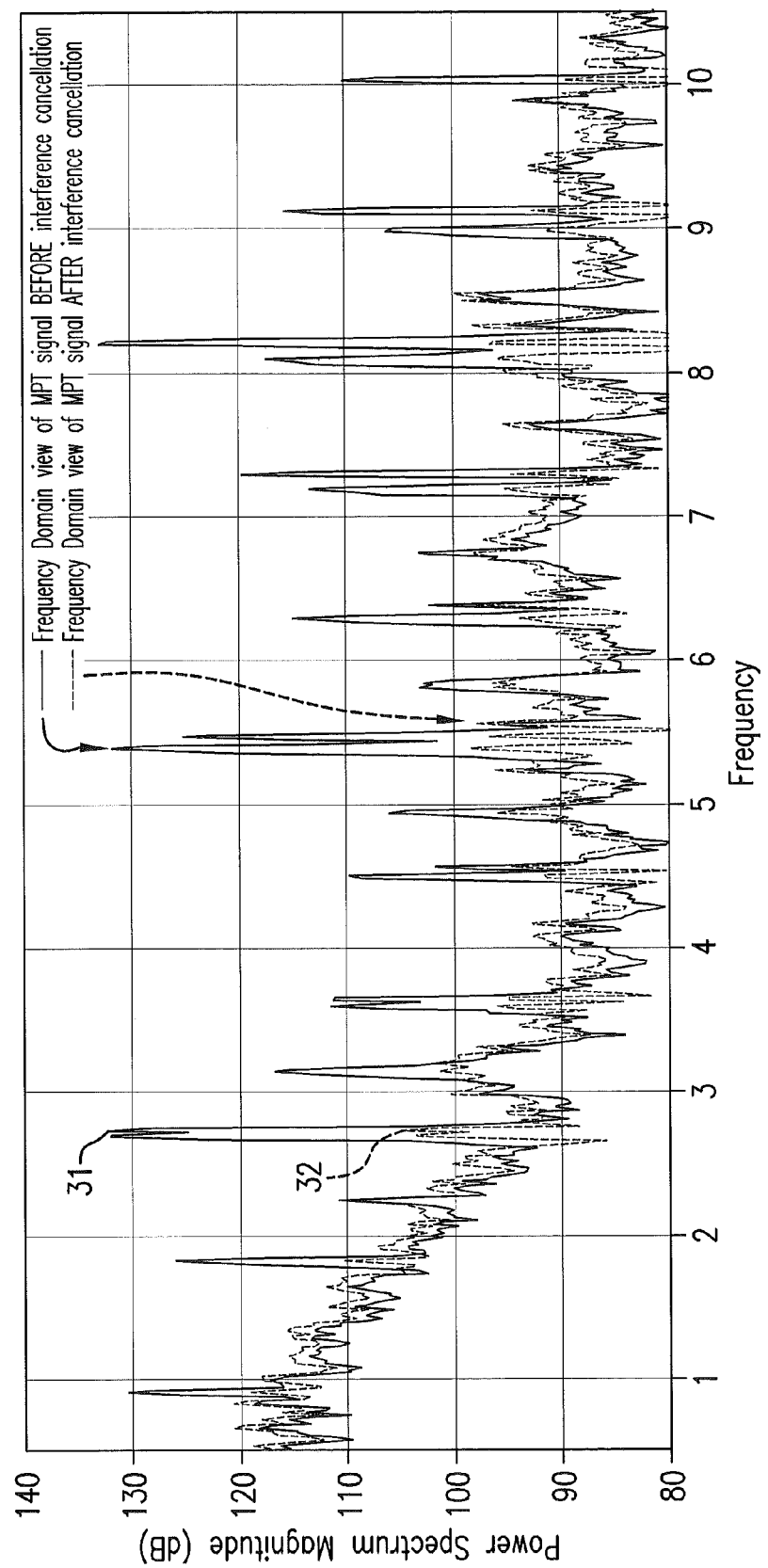
FIG. 3 depicts aspects of an amplitude spectrum before and after the interference reduction method is applied.

FIG. 3 demonstrates the results of applying the interference reduction method 20 to a mud-pulse telemetry signal. The amplitude spectrum of the input signal and the amplitude spectrum of the output signal having reduced interference are illustrated in the frequency domain. The received baseband mud-pulse telemetry signal (i.e., input signal) shown at 31 is heavily disturbed by strong co-channel interferers. As can be seen, the strong co-channel interferers are removed from the output signal shown at 32.

It can be appreciated that the interference reduction method 20 has inherent flexibility that allows its use in various deployments. This inherent flexibility is achieved by proper selection or configuration of the following parameters: (i) the sampling rate fs (i.e., rate at which the incoming signal is sampled (not shown in block diagram)); (ii) the segmentation (window) length N; (iii) the transformation block length M; (iv) the length of the segment overlap (e.g., percent overlap); (v) the length of the median filter, if median filtering is used as the non-linear filtering technique; and (vi) any of the threshold values for calculation of output amplitude vector Â from vectors A and Ã.

It can be appreciated that the disclosed interference reduction method has several advantages. In contrast to existing interference cancellation methods, the disclosed interference reduction method does not need a signal from a second receiver or sensor or signals from special noise measuring sensors such as, for example, mud pump strobe sensors mounted at the mud pumps. Furthermore, it is advantageous that the disclosed interference reduction method does not need manual calibration and can be used automatically on any mud-pulse telemetry signal. Moreover, the disclosed interference reduction method can be combined with existing interference cancellation methods.

The method flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

In support of the teachings herein, various analysis components may be used, including a digital and/or an analog system. For example, the transmitter 9, the receiver 11, or the surface computer processing 12 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing interference in a received downhole telemetry signal, the method comprising:
   receiving a downhole telemetry signal in a time domain with a receiver;
   segmenting the received signal into a plurality of signal segments;
   windowing each signal segment in the plurality of signal segments to generate a plurality of windowed signal segments;
   transforming each windowed signal segment in the plurality of windowed signal segments into a complex variable domain to generate a plurality of complex variable domain segments, each complex variable domain segment having an in-phase component vector I and a quadrature component vector Q;
   calculating a real amplitude vector A from the in-phase component vector I and the quadrature component vector Q for each complex variable domain segment;
   filtering interferers in the amplitude vector A for each complex variable domain segment to generate a filtered amplitude vector $\tilde{A}$ for each complex variable domain segment;
   recalculating an amplitude of the amplitude vector A using the filtered amplitude vector $\tilde{A}$ for each complex variable domain segment to generate an output amplitude vector $\hat{A}$ for each complex variable domain segment;
   scaling the in-phase component vector I and the quadrature component vector Q by a factor $\hat{A}/A$ for each complex variable domain segment to generate an output in-phase component vector I' and an output quadrature component vector Q' for each complex variable domain segment; and
   transforming I' and Q' for each complex variable domain segment into the time domain to provide an interference-reduced output signal in the time domain;
   wherein the segmenting, windowing, transforming each windowed signal segment, calculating a real amplitude vector A, filtering, recalculating, scaling I and Q, and transforming I' and Q' are performed using a processor.

2. The method according to claim 1, wherein each signal segment in the plurality of signal segments overlaps an adjacent signal segment.

3. The method according to claim 2, wherein an amount of overlap is expressed as a percentage of a length N of the signal segment being overlapped.

4. The method according to claim 1, wherein the complex variable domain is a frequency domain.

5. The method according to claim 1, wherein the windowing is performed using a Hamming window.

6. The method according to claim 1, wherein the windowing comprises using the plurality of signal segments as the plurality of windowed signal segments.

7. The method according to claim 1, wherein the transforming each windowed signal segment is performed using a discrete Fourier transform.

8. The method according to claim 1, wherein a length of a signal segment is N, the transformation is performed in blocks having a block length M, and if M is less than N then padding the block with zeros.

9. The method according to claim 1, wherein the filtering interferers in the amplitude vector A comprises a non-linear filtering operation.

10. The method according to claim 9, wherein the non-linear filtering operation comprises using a median filter.

11. The method according to claim 1, wherein the recalculating an amplitude comprises calculating a difference between the amplitude vector A and the filtered vector $\tilde{A}$ and if the difference is greater than a predefined threshold, then using corresponding elements of $\tilde{A}$ as the output amplitude vector $\hat{A}$.

12. The method according to claim 1, wherein the recalculating an amplitude comprises comparing the amplitude vector A against a predefined threshold vector (t2+1) $\tilde{A}$ where t2 is a configurable threshold.

13. The method according to claim 1, wherein the recalculating an amplitude comprises copying the amplitude vector A and then replacing all values exceeding a threshold value with corresponding values from the filtered amplitude vector $\tilde{A}$.

14. The method according to claim 1, wherein the transforming I' and Q' comprises using an inverse discrete Fourier transform.

15. The method according to claim 1, wherein the transforming I' and Q' comprises using an overlap-add method to account for any overlap in adjacent signal segments in the plurality of signal segments.

16. The method according to claim 1, wherein the downhole telemetry signal comprises a mud-pulse telemetry signal.

17. An apparatus for reducing interference in a received downhole telemetry signal, the apparatus comprising:
   a receiver configured to receive a downhole telemetry signal in a time domain; and
   a processor coupled to the receiver and configured to implement a method comprising:
   segmenting the received signal into a plurality of signal segments;
   windowing each signal segment in the plurality of signal segments to generate a plurality of windowed signal segments;
   transforming each windowed signal segment in the plurality of windowed signal segments into a complex variable domain to generate a plurality of complex variable domain segments, each complex variable domain segment having an in-phase component vector I and a quadrature component vector Q;
   calculating a real amplitude vector A from the in-phase component vector I and the quadrature component vector Q for each complex variable domain segment;
   filtering interferers in the amplitude vector A for each complex variable domain segment to generate a filtered amplitude vector $\tilde{A}$ for each complex variable domain segment;
   recalculating an amplitude of the amplitude vector A using the filtered amplitude vector $\tilde{A}$ for each complex variable domain segment to generate an output amplitude vector $\hat{A}$ for each complex variable domain segment;
   scaling the in-phase component vector I and the quadrature component vector Q by a factor $\hat{A}/A$ for each complex variable domain segment to generate an output in-phase component vector I' and an output quadrature component vector Q' for each complex variable domain segment; and
   transforming I' and Q' for each complex variable domain segment into the time domain to provide an interference-reduced output signal in the time domain.

18. The apparatus according to claim 17, wherein the downhole telemetry signal comprises a mud-pulse telemetry signal.

19. The apparatus according to claim 18, wherein the receiver is configured to receive a series of pressure pulses in drilling fluid and convert the series of pressure pulses into the mud-pulse telemetry signal, the mud-pulse telemetry signal comprising data obtained from a downhole tool disposed at a drill tubular.

20. A non-transitory computer readable medium comprising computer executable instructions for reducing interference in a received downhole telemetry signal by implementing a method comprising:
    segmenting a received downhole telemetry signal in a time domain into a plurality of signal segments;
    windowing each signal segment in the plurality of signal segments to generate a plurality of windowed signal segments;
    transforming each windowed signal segment in the plurality of windowed signal segments into a complex variable domain to generate a plurality of complex variable domain segments, each complex variable domain segment having an in-phase component vector I and a quadrature component vector Q;
    calculating a real amplitude vector A from the in-phase component vector I and the quadrature component vector Q for each complex variable domain segment;
    filtering interferers in the amplitude vector A for each complex variable domain segment to generate a filtered amplitude vector $\tilde{A}$ for each complex variable domain segment;
    recalculating an amplitude of the amplitude vector A using the filtered amplitude vector $\tilde{A}$ for each complex variable domain segment to generate an output amplitude vector $\hat{A}$ for each complex variable domain segment;
    scaling the in-phase component vector I and the quadrature component vector Q by a factor $\hat{A}/A$ for each complex variable domain segment to generate an output in-phase component vector I' and an output quadrature component vector Q' for each complex variable domain segment; and
    transforming I' and Q' for each complex variable domain segment into the time domain to provide an interference-reduced output signal in the time domain;
    wherein the segmenting, windowing, transforming each windowed signal segment, calculating a real amplitude vector A, filtering, recalculating, scaling I and Q, and transforming I' and Q' are performed using a processor.

* * * * *